United States Patent [19]
Chen

[11] Patent Number: 5,901,515
[45] Date of Patent: May 11, 1999

[54] RAISED FLOOR HAVING MULTIPLE LAYERS

[76] Inventor: Yao-Chung Chen, 4F, No. 13, Alley 2, Lane 95, Sec. 3, Mu-Shih Rd., Taipei, Taiwan

[21] Appl. No.: 09/065,503

[22] Filed: Apr. 24, 1998

[51] Int. Cl.$^6$ ............................................. E04B 5/08
[52] U.S. Cl. .................... 52/263; 52/220.1; 52/220.4; 52/220.6; 52/506.08
[58] Field of Search ..................... 52/220.1, 220.2, 52/220.4, 220.5, 220.6, 220.7, 220.8, 263, 506.08, 506.06

[56] References Cited

U.S. PATENT DOCUMENTS

| | | | |
|---|---|---|---|
| 4,546,580 | 10/1985 | Ueno et al. | 52/126.1 |
| 4,901,490 | 2/1990 | Zinniel et al. | 52/263 |
| 5,031,369 | 7/1991 | Kobayashi et al. | 52/126.6 |
| 5,049,700 | 9/1991 | Kobayashi et al. | 52/263 X |
| 5,140,791 | 8/1992 | Kimbrough | 52/221 |
| 5,268,157 | 12/1993 | Chen | 52/263 |

*Primary Examiner*—Christopher Kent
*Assistant Examiner*—Yvonne Horton-Richardson
*Attorney, Agent, or Firm*—Ware, Fressola, Van der Sluys & Adolphson LLP

[57] ABSTRACT

Disclosed is a raised floor to be installed on the subfloor of a room. The raised floor is constructed with a plurality of upper layer plates and lower layer plates separated and supported by a plurality of base seats. The separation between the lower layer plates and the subfloor forms an air space which can be used as an air-conditioning conduct. The gap between the upper layer plates and the lower layer plates is used as a conduit for computer network wiring. A plurality of cover plates are used to cover the gaps between adjacent upper layer plates. Bellowses and vents are used to induce the cool air in the air conditioning conduct to reach above the raised floor surface.

9 Claims, 9 Drawing Sheets

FIG. 1

(PRIOR ART)

RAISED FLOOR HAVING MULTIPLE LAYERS

BACKGROUND OF THE INVENTION

1. Field of the Invention

The present invention is related to a raised floor having a number of separated layers to provide conduits for air-conditioning and computer network wiring.

2. Description of the Prior Art

Figure 1:
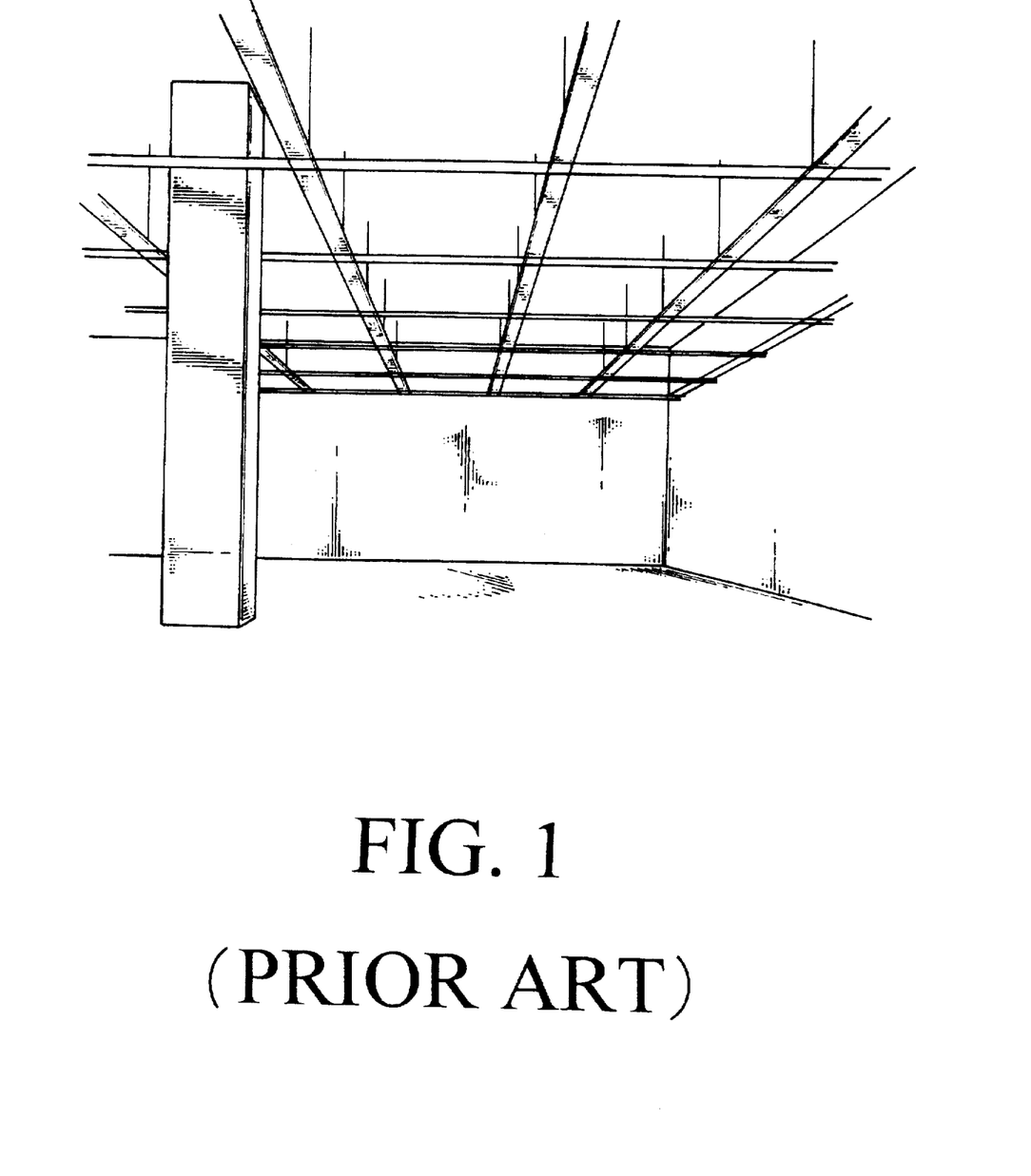
FIG. 1 is a perspective view of the conventional ceiling structure.

In an office building where a centralized air-conditioning system is used to provide cool air to a number of offices, a hanging ceiling is usually required to be installed to conceal the air-conditioning ducting. Such a hanging ceiling, as shown in FIG. 1, is formed by a base, a plurality of crossed plates, vertical frames, horizontal frames, and other components to be installed under an existing ceiling. In most cases, the air-conditioning vents are also located on the hanging ceiling. Because of the long distance between the vents and the floor below, the cool air coming out from the vent will lose some of its effect by the hot air floating above the room before it can cool the air near the floor level. Thus, in order to retain the desired cool temperature in the room, the thermostat must be lowered. This results in a waste of electrical power. Furthermore, as the cool air is directly and constantly blown toward the head of the people working in the offices, work-related sickness can sometimes be induced. Moreover, as the dust on the hanging ceiling is dispersed into the room by the vented air, it degrades the air quality in the room. More importantly, whenever the air conditioning ducting needs to be repaired, it is necessary to open up the hanging ceiling. This will cost a lot of time and money. Furthermore, in an office where there is an existing raised floor for accommodating the wiring for computer network, an additional hanging ceiling will reduce the working space of the office.

It is advantageous to provide a raised floor having a number of layers to form a number of separated air gaps so that the air conditioning ducting and the computer network wiring can both be accommodated. This type of raised floor can reduce the cost of air conditioning as the cool air is provided near the floor level.

SUMMARY OF THE INVENTION

Accordingly, it is the main objective of the present invention to provide a raised floor wherein air-conditioning ducting and vents and computer network wiring can all be accommodated.

It is a further objective of the present invention to provide a raised floor which has a preferred cooling effect without degrading the indoor air quality.

It is another objective of the present invention to provide a raised floor wherein airconditioning ducting is easily accessed for repair.

In order to achieve the aforementioned objectives, the present invention provides a raised floor to be installed on the subfloor of an office or a room. The raised floor is constructed with a number of layers. The air space between layers and the air space between the lower layer and the subfloor can be used as air-conditioning conduit and computer network wiring conduit. The raised floor, according to the present invention, comprises a multiplicity of base seats, lower layer plates, and upper layer plates. A number of studs are mounted on each of the base seats to support the layer plates and separate the lower layer plates from the upper layer plates. The separation between the lower layer plates and the subfloor is intended for use as an air conduit while the gap between the upper layer plates and the lower layer plates is intended for accommodating computer network wiring. The cool air in the lower air space can be vented through a number of bellows connecting some of the lower layer plates to the vents mounted on the upper layer plates. Preferably, the upper layer plates are much smaller than the lower plates, so that a rectangular or square grid of conduits are formed between the upper layer plates. This grid of conduits is suitable for installing computer network wiring. In order to complete the floor surface, a multiplicity of center cover plates and edge cover plates are used to cover the network wiring conduits.

With the raised floor, according to the present invention, air conduits and computer network wiring can be installed in any office with minimal installation cost.

The present invention will be better understood and its numerous objectives and advantages will become apparent to those skilled in the art by referencing to the following drawing figures.

BRIEF DESCRIPTION OF THE DRAWINGS

FIG. 3-1 is an exploded view of a base seat.

DETAILED DESCRIPTION OF THE PREFERRED EMBODIMENT

Figure 2:
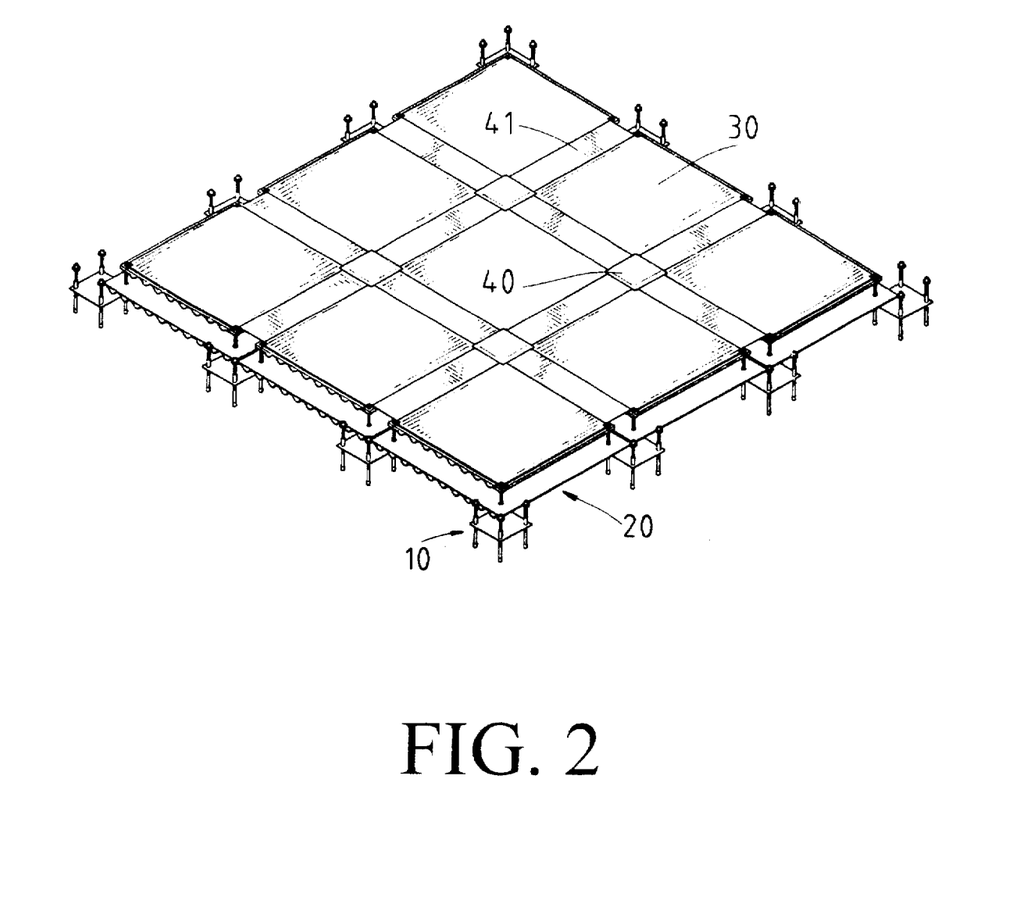
FIG. 2 is a perspective view of the present invention.
Figure 3:
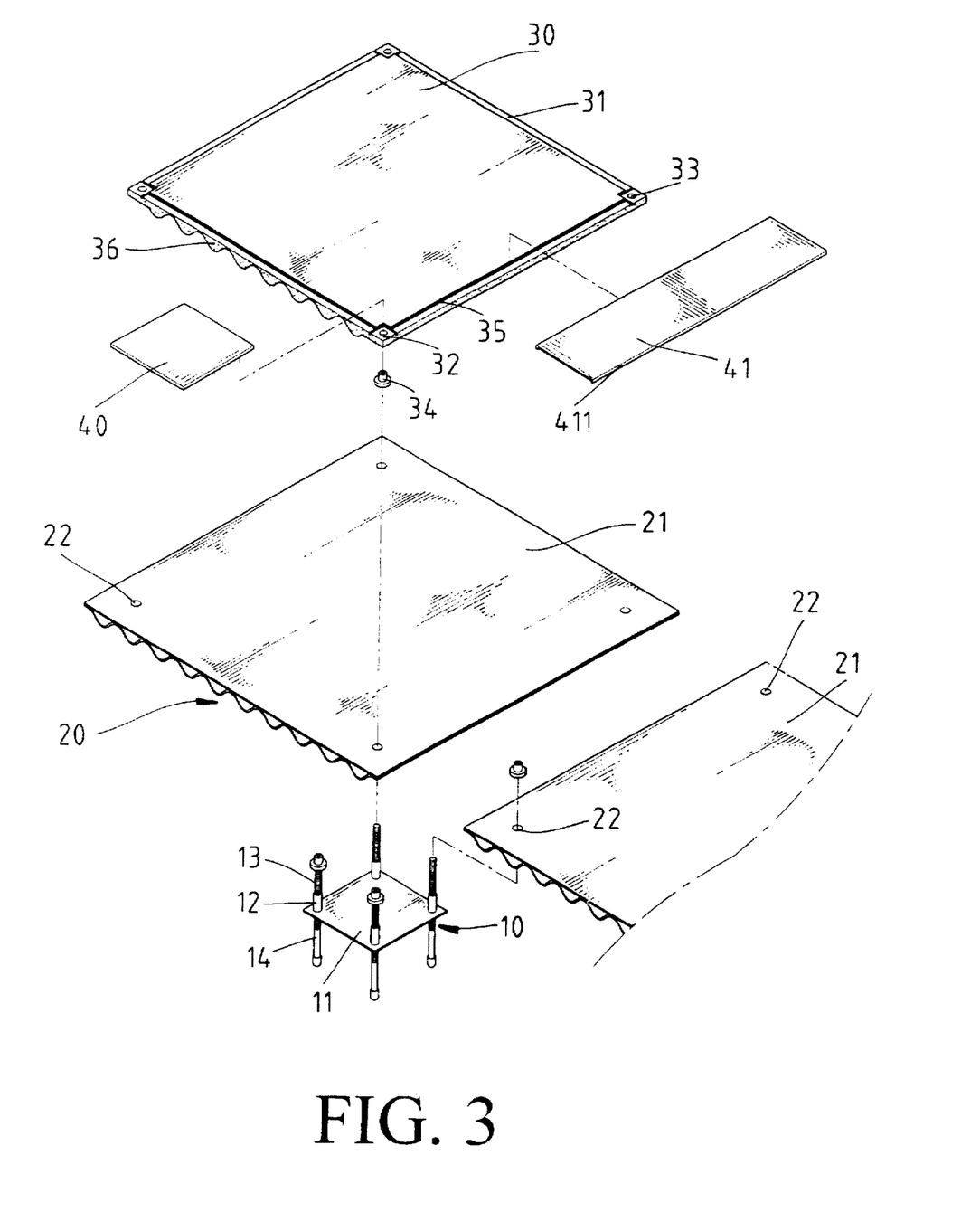
FIG. 3 is an exploded view of the raised floor of the present invention.
Figure 31:
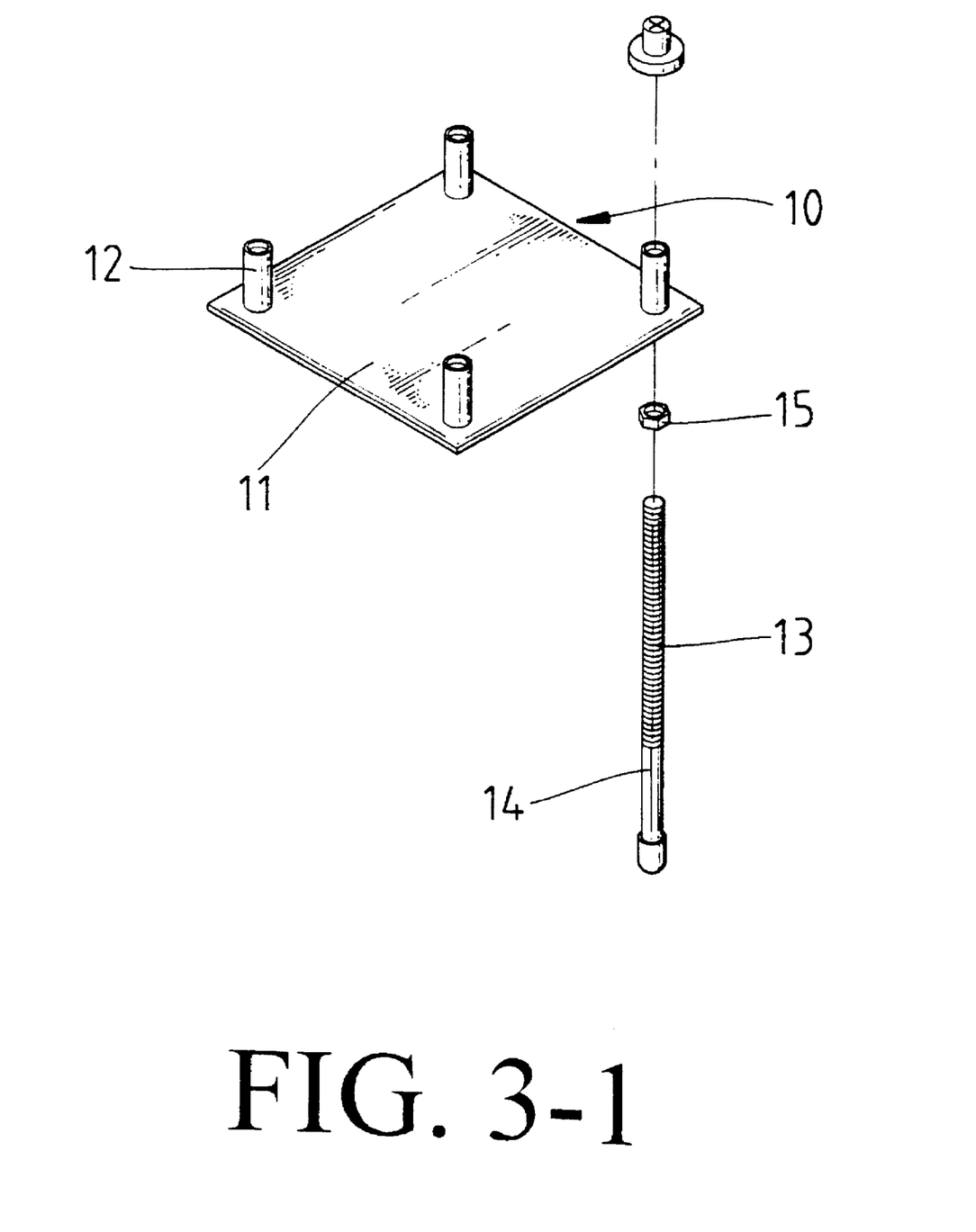

As shown in FIG. 2 and FIG. 3, the raised floor of the present invention comprises a plurality of base seats 10, lower layer plates 20, upper layer plates 30, center cover plates 40, and edge cover plates 41. As shown in FIG. 3 and FIG. 3-1, the base seat 10 comprises a base plate 11 having a plurality of projected stud holes 12. Each stud hole 12 is used to mount a stud 14 having a treaded section 13. The stud 14 is secured by a nut 15.

Figure 4:
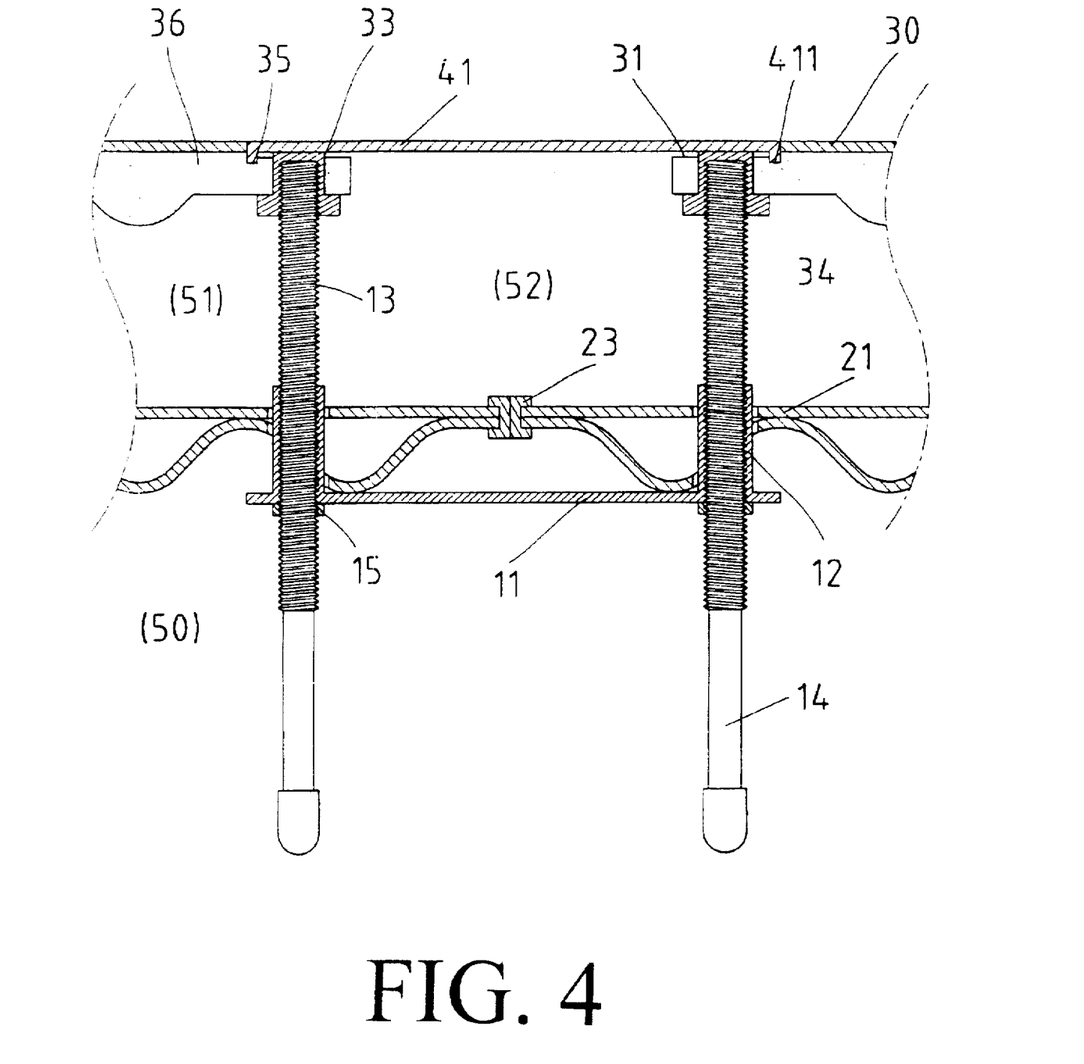
FIG. 4 is a partial cross sectional view of the present invention.

Preferably, the lower layer plate 20 comprises a flat plate 21 and an underlying corrugated sheet. Such a structure can provide a desired strength while having the function of noise reduction. As shown in FIG. 3, a plurality of stud holes 22 are provided on the lower layer plate 20. The stud holes 22 are used to connect four lower layer plates to a base seat through the studs 14. The upper layer plate 30 has a number of recesses 32 at the plate corners and a number of through-holes 33. The through-role 33 is used to accommodate a stud cap 34. Preferably, the upper layer plate 30 is made of a flat surface plate having therebelow a layer of light concrete 36. The upper surface of the upper layer plate 30 also has four linear recesses 31 along the edges and four grooves 35. Each groove 35 is located at the inner side of an edge recess 31. The corner recesses 32 are used to fit the center cover plates 40 while the edge recesses 31 are used to fit the edge cover plates 41. As shown in FIG. 2 and FIG. 3, the center cover plate 40 is square. But it can be in other shapes. As shown in FIG. 3 and FIG. 4, the edge cover plate 41 is bent along its longer edges to form two shallow angles 411. The shallow angles 411 are used to seat in the grooves 35 for securing the edge cover plate 41 to the raised floor surface as each edge cover plate covers the gap between two adjacent upper layer plates 33. As shown in FIG. 4, when the raised floor is assembled, the corrugated sheet of the lower layer plate 20 is seated on the base plate 11 of the base seat 10. The light concrete layer 36 of the upper layer 30 is seated on the stud cap 34 which is adjustably mounted on the end of the stud 14. The separation between the upper layer plates 30 and the flat plates 21 of the lower layer plates defines a gap 51. The separation between the cover plates 40, 41 and the flat plates 21 of the lower layer plates defines the grid of conduits 52. The air gap 50 is formed between the lower layer plates and the subfloor. The height of the air gap 50 is determined by the lower section of the studs 14.

Figure 5:
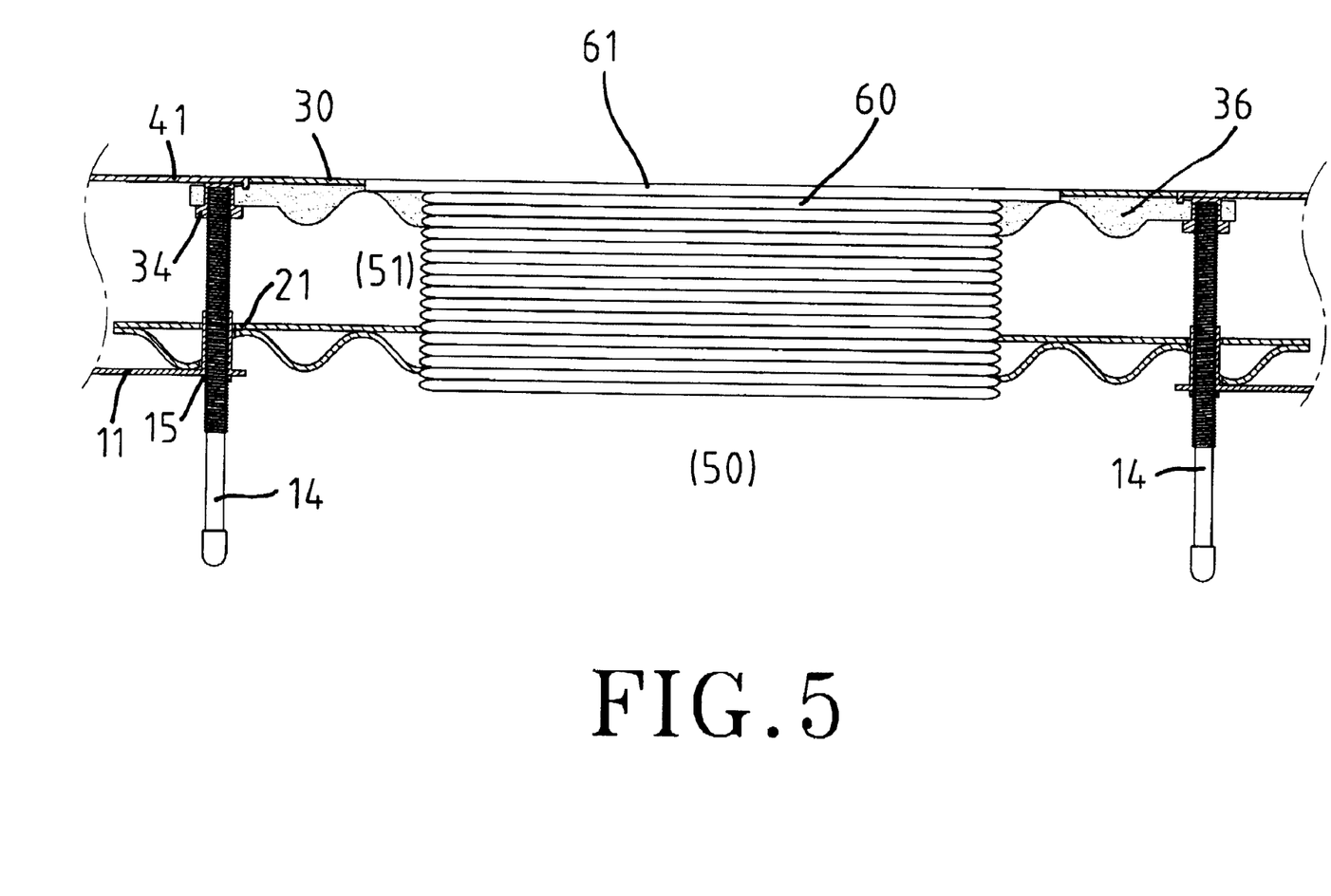
FIG. 5 is a cross sectional view of the bellows and the vent.
Figure 6:
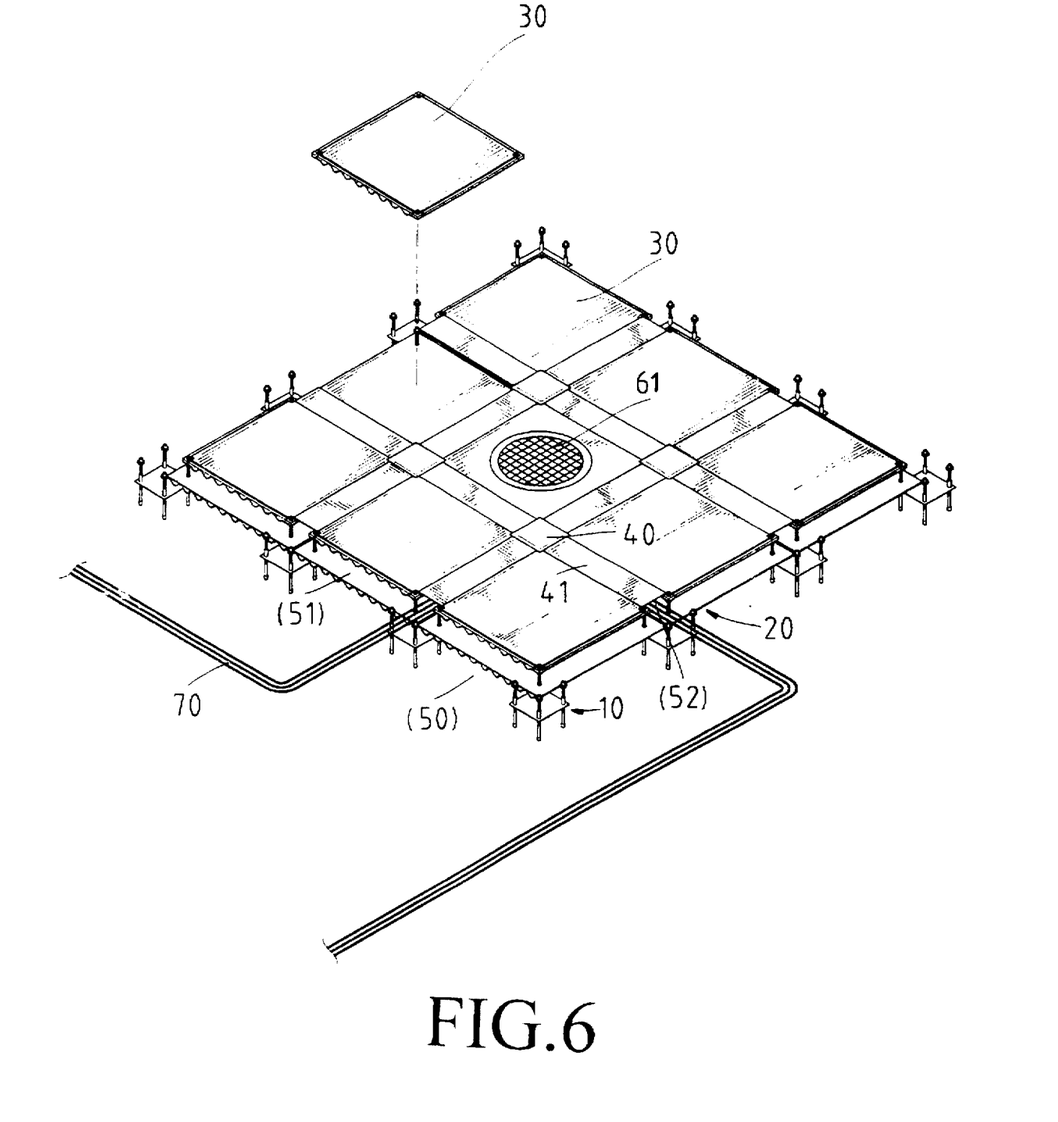
FIG. 6 is an application embodiment of FIG. 5.

As the air gap 50 is intended for use as an air-conditioning conduit, it is preferred that a plurality of clamps 23 are used to seal off the gaps between adjacent lower layer plates. In order to induce the cool air in the air gap 50 to reach above the raised floor surface, a number of bellows 60 are connected to a number of vents 61, as shown in FIG. 5 and FIG. 6. It is understood that a vent can be mounted on one of the upper layer plates 30.

As shown in FIG. 6, the wiring for computer network can be installed in the gap 52. The wiring is denoted by numeral 70.

Figure 7:
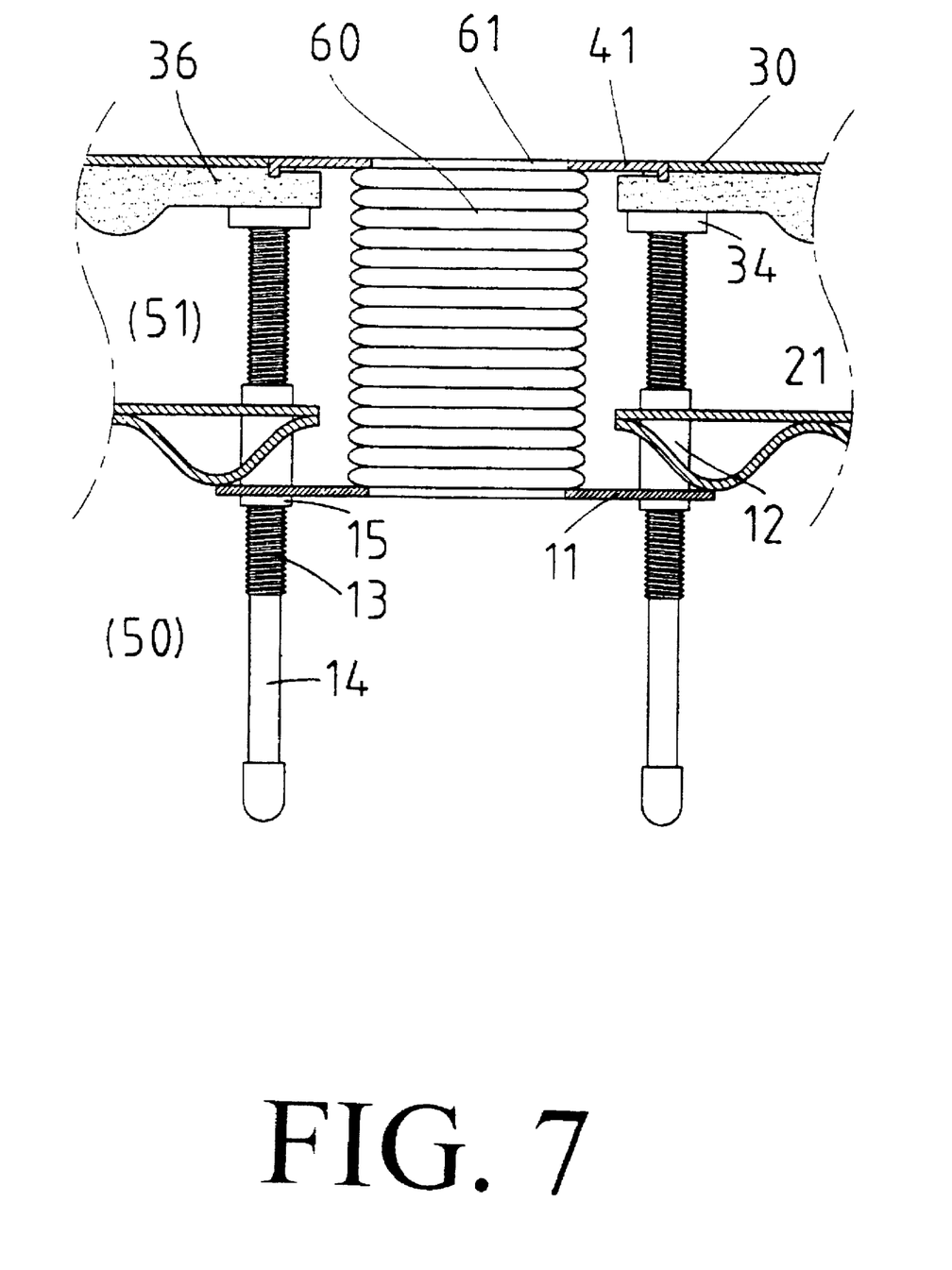
FIG. 7 is a cross sectional view of another embodiment of the raised floor showing the bellows and the vent.
Figure 8:
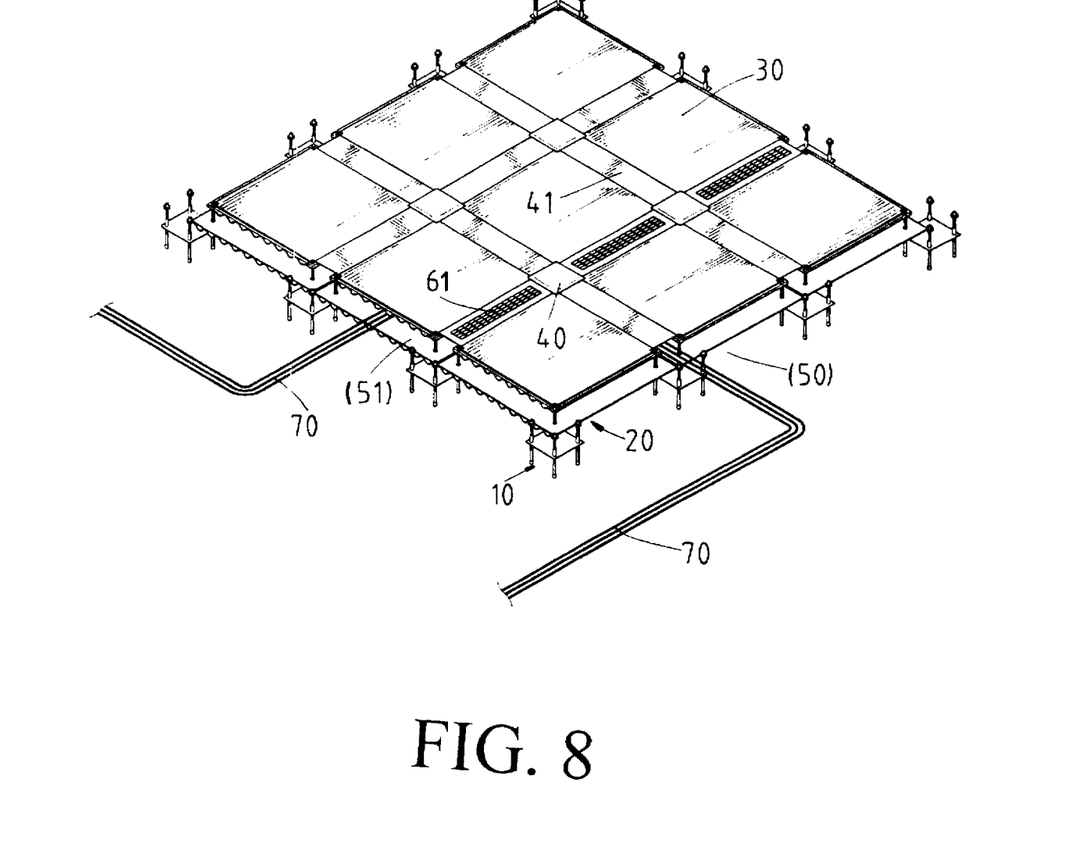
FIG. 8 is an application embodiment of FIG. 7.

FIG. 7 and FIG. 8 show another embodiment of the present invention. As shown in FIG. 7, the bellows 60 is mounted on the base plate 11 of the base seat, instead of the lower layer plate. The vent 61 is located on the edge cover plate 41, instead of the upper layer plate. With this application embodiment, the wiring 70 for computer network can be installed in the air gap 51, in addition to the air gap 52, as shown in FIG. 8.

Preferably, the base plate 11 and the lower layer plate 20 are made of metal or other sturdy materials.

In summary, in the raised floor of the present invention, the air-conditioning conduit and the computer network wiring conduit can share the same multiple layer structure. As the cool air is induced into an office through the floor vents, the air-conditioning effect is improved and the energy cost can be reduced.

While certain preferred embodiments of the present invention have been shown and described in detail, it should be understood that various changes and modification may be made therein without departing from the scope of the appended claims.

What is claimed is:

1. A raised floor having multiple layers to be installed on the subfloor of a room for providing an air-conditioning conduit for cool air and a conduit for computer network wiring, said raised floor comprising a multiplicity of base seats, lower layer plates, upper layer plates, center cover plates and edge cover plates, wherein the base seat has a base plate on which a plurality of projected stud holes are provided for mounting a plurality of studs each of which is capped with a stud cap;

the lower layer plate has a plurality of stud holes to engage with the studs so as to allow four lower layer plates to be seated on one base plate, leaving a first air gap between the lower layer plates and the subfloor to be used as an air-conditioning conduit, the upper layer plate has a plurality of through holes each of which is fitted with one stud cap so as to allow four upper layer plates to be seated on one base seat, leaving a second air gap between the lower layer plates and upper layer plates; the upper layer plate has a smaller size than the lower plate, leaving a third gap between adjacent upper layer plates when the upper layer plates are seated on the base seats; each upper layer plate has four edge recesses so as to allow each edge cover plate to properly cover the third gap between two adjacent upper layer plates; the upper layer plate has a plurality of corner recesses so as to allow each center cover plate to properly cover the gap defined by the corners of four upper layer plates seating on a base seat;

said raised floor further comprising vents and bellows for inducing the cool air from the first air gap into the room.

2. The raised floor of claim 1 wherein the vents are mounted on the upper layer plates and bellows are mounted on the lower layer plates and connected to the vents so as to allow the cool air from the first air gap to be induced into the room through the vents.

3. The raised floor of claim 1 wherein the vents are mounted on the edge cover plates and the bellows are mounted on the base plates and connected to the vents so as to allow the cool air from the first air gap to be induced into the room through the vents.

4. The raised floor of claim 1 wherein each edge recess on the upper layer plate has a groove and each cover plate has two shallow angles to be engaged in the grooves in two adjacent upper layer plates.

5. The raised floor of claim 1 wherein the base plates are made of metal.

6. The raised floor of claim 1 wherein the lower layer plate comprises a flat plate and a corrugated sheet.

7. The raised floor of claim 1 wherein the lower layer plates are made of metal.

8. The raised floor of claim 1 wherein the upper layer plate comprises an underlying light concrete layer.

9. The raised floor of claim 1 further comprising a plurality of clamps to be mounted on the edge of the lower layer plates for sealing off the gaps between adjacent lower layer plates.

* * * * *